United States Patent [19]

Terzini

[11] Patent Number: 5,301,985
[45] Date of Patent: Apr. 12, 1994

[54] DOUBLE POINT SUPPORTED LOCKING LEVER FOR A HOSE COUPLING ASSEMBLY

[75] Inventor: Vittorio Terzini, Weston, Canada
[73] Assignee: Angus Fire Armour Corp., Angier, N.C.
[21] Appl. No.: 26,753
[22] Filed: Mar. 5, 1993
[51] Int. Cl.⁵ ............................................. F16L 55/00
[52] U.S. Cl. ..................................... 285/79; 285/87; 285/376
[58] Field of Search ................. 285/87, 88, 76, 69, 285/72, 76, 79, 376

[56] References Cited

U.S. PATENT DOCUMENTS

| | | | |
|---|---|---|---|
| 320,939 | 6/1885 | Longmore | 285/87 |
| 935,082 | 9/1909 | Anderson | 285/88 |
| 941,990 | 11/1909 | Hickey | 285/88 |
| 1,613,644 | 1/1927 | Costello | 265/87 X |
| 1,770,570 | 7/1930 | Costello | 285/87 X |
| 1,808,382 | 6/1931 | Stauffer | 285/79 X |
| 4,129,323 | 12/1978 | Wilson | 285/87 X |

Primary Examiner—Dave W. Arola
Attorney, Agent, or Firm—Rhodes, Coats & Bennett

[57] ABSTRACT

The present invention entails a hose coupling assembly having a pivotally mounted locking lever for engaging and locking against a cam lock. The hose clamping assembly including a pair of rotating and mating locking collars with each locking collar having a series of circumferentially spaced lugs formed about the outer surface thereof. The locking lever referred to above is integrally formed with a selected lug on each locking collar. The mounting lug includes a transverse cavity formed through the lug and mounted within the lug cavity is a pivot pin that is supported about opposite ends by the lug structure itself. The locking lever is in turn pivotally mounted on the pivot pin and is spring biased to assume a locked position.

2 Claims, 3 Drawing Sheets

DOUBLE POINT SUPPORTED LOCKING LEVER FOR A HOSE COUPLING ASSEMBLY

BACKGROUND OF THE INVENTION

Hose coupling assemblies are utilized to couple two ends of a hose, such as a fire hose. These hose couplings must be strong and rugged because they must create and hold a tight seal and must be able to withstand impact and abuses of all types while still maintaining a tight and secure seal. Conventionally, these hose coupling assemblies have been of various designs. But one particular design that has been utilized widely is the so-called non-threaded type. Many non-threaded type hose couplings include a pair of rotating collars where each rotating collar includes an externally actuated locking mechanism. One particular design for a latching or locking mechanism for a hose coupling assembly of this type includes a pivotally mounted lever-type locking arm that is externally actuated but includes a locking head that projects downwardly through the associated collar to engage and lock against a cam latch or lock. This lever-type locking arm in past designs has been pivotally mounted on a cantilevered pivot pin and because of that, has been very susceptible to breakage and failure. Since the pivot pin for the latch arm is only supported at one end any substantial impact against the free or unsupported end of the pivot pin may break or fracture the pivot pin and accordingly, this can cause the entire coupling assembly to fail.

Therefore, there is and continues to be a need for a strong and sturdy external latch assembly for a non-threaded hose coupling assembly.

SUMMARY AND OBJECTS OF THE INVENTION

The present invention entails a non-threaded hose coupling assembly that includes an external lever-type latch arm that is integrally formed with an external lug on a respective rotating collar that forms a part of the hose coupling assembly. In particular, the hose coupling assembly of the present invention includes two freely rotating locking collars that are designed to mate together and close tightly against each other to effectively close or secure the coupling assembly. Each rotating collar includes a series of circumferentially spaced lugs formed around the exterior surface of the collar. Each locking collar includes at least one lug that has a transverse cavity opening formed therein and the lever-type latch for the hose coupling extends through this cavity formed in the lug and a pivot pin is supported at both ends across the lug cavity. Thus, the latch arm can be rotated about the double point supported pivot pin and the lug itself has the effect of protecting the pin at both ends from substantial impact.

It is therefore an object of the present invention to provide an improved support structure for supporting one or more latches that form a part of a non-threaded hose coupling.

Still a further object of the present invention is to provide a non-threaded hose coupling that affords better protection against "snap" breakage.

Another object of the present invention resides in the provision of a non-threaded hose coupling assembly that includes one or more lever-type latches that provide for double shear points on the pivot pin supporting the lever-type latch.

Still a further object of the present invention resides in the provision of a non-threaded hose coupling assembly wherein the latch of the coupling assembly is integral with a lug that is formed on the outside of the coupling assembly.

Other objects and advantages of the present invention will become apparent and obvious from a study of the following description and the accompanying drawings which are merely illustrative of such invention.

DETAILED DESCRIPTION OF THE INVENTION

Figure 1:
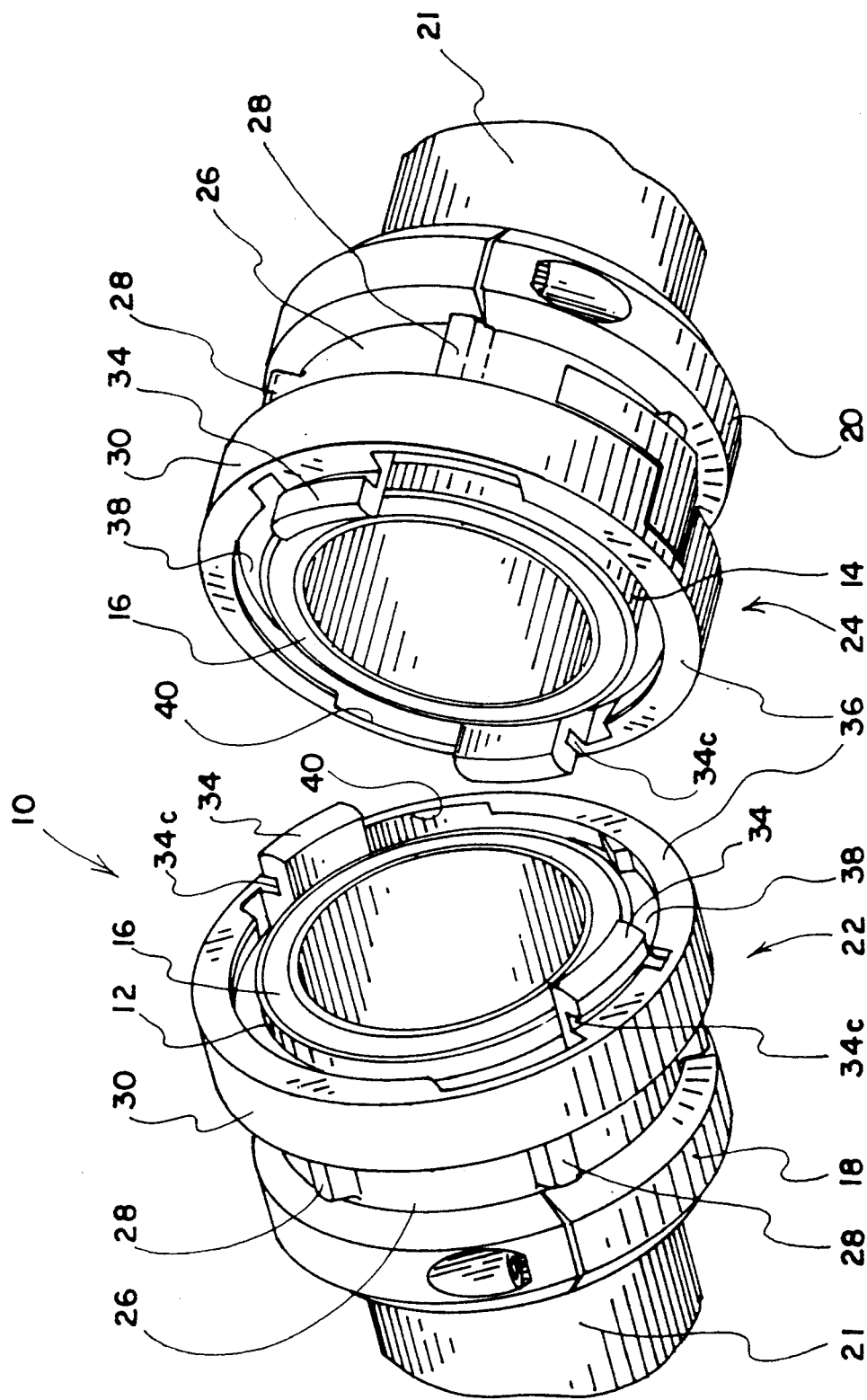
FIG. 1 is perspective view showing two ends of a hose having the hose coupling assembly of the present invention connected thereto.

With further reference to the drawings, the hose clamping assembly of the present invention is shown therein and indicated generally by the numeral 10. As seen in the drawings, the hose clamping assembly 10 is designed to fit about two ends 21 of a hose and to couple the hose together to form a tight and sealed coupled relationship.

Viewing the coupling assembly 10 in more detail, it is seen that the same includes a pair of inner flanges 12 and 14, each inner flange being inserted within the open end of a hose 21 and projecting outwardly therefrom. Each inner flange 12 and 14 includes a face seal 16 and wherein the respective face seals 16 abut each other and form a tight seal connection between the two inner flanges 12 and 14 when the hose coupling assembly 10 assumes a coupled mode.

To secure the inner flanges 12 and 14 within the hose ends 21, there is provided a stationing collar 18 and 20 about the exterior of each hose end 21. Each stationing collar 18 and 20 is tightly secured down on the exterior of the hose 21 and accordingly forms a tight securement about the hose 21 and effectively sandwiches the hose 21 between a respective inner flange 12 or 14 and a respective stationing collar 18 or 20. It is thusly appreciated that the stationing collars 18 and 20 tightly secure the inner flanges 12 and 14 within the respective hose ends 21.

Rotatively mounted between the stationing collars 18 and 20 and the outer sides of the inner flanges 12 and 14 is a locking collar 22, 24. Each locking collar 22 and 24 is freely rotatable about a respective inner flange 12 and 14. As will be appreciated from subsequent portions of this disclosure, the coupling assembly 10 will effectively pull the respective locking collars 22 and 24 tightly adjacent the other and will effectively lock the locking collars 22 and 24 in a close and tight coupled relationship. The locking collars 22 and 24 will in turn pull the face seal 16 of the inner flanges 12 and 14 closely together and form a sealed relationship between the inner flanges 12 and 14.

Now viewing the respective locking collars 22 and 24 in more detail, it is seen that each locking collar comprises an inner sleeve 26 that has a series of reinforcing lugs 28 circumferentially disposed about the outer surface of the inner sleeve 26. Disposed adjacent the inner sleeve 26 and lugs 28 is an outer rim 30. Projecting outwardly from the outer rim 30 on each locking collar 22 and 24 is a pair of spaced apart cam locks 34. As will be appreciated from subsequent portions of the disclosure, the respected cam locks 34 of one locking collar will project therefrom into the other locking collar and by selectively rotating the locking collars 22 and 24 the cam locks will be engaged by locking or latching mechanism so as to securely lock the respective locking collars 22 and 24 together.

Figure 4:
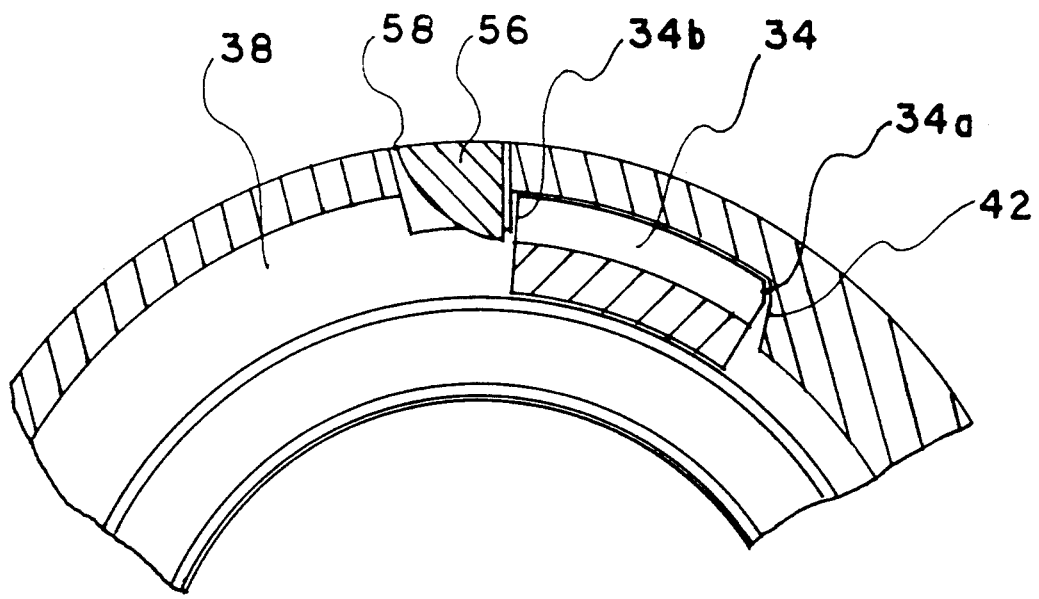
FIG. 4 is a fragmentary sectional view taken through the line 4—4 of FIG. 2.

Viewing each cam lock 34 in more detail and with particular reference to FIG. 4, it is seen that each cam lock 34 includes a leading cam edge 34a and a trailing locking edge 34b. In addition, disposed interiorly of the cam lock 34 is a cut-out 34c. The significance of the cut-out 34c will be more fully appreciated from subsequent portions of this disclosure.

Formed about the outer exposed side of each locking collar 22 and 24 is an outer face 36. Outer face 36 in conjunction with the outer rim 30 forms a race or a recess 38 that extends around the outside of each locking collar 22 and 24. Formed in the outer face 36 is a cam lock inlet 40. The cam lock inlet 40 permits a respective cam lock 34 to be inserted into the recess 38 of the other locking collar 22 or 24. It should be appreciated that the pair of cam locks 34 projecting from a certain locking collar 22 or 24 can be projected into and through the cam lock inlets 40 formed in the other locking collar and thereafter the respective locking collars can be rotated such that the cam locks 34 move through the respective recesses 38 formed around the locking collars 22 and 24. At selected points within each recess 38 there is provided a cam lock stop 42. The purpose of each cam lock stop 42 is to provide a stop that restricts the travel of the respective cam locks 34.

It should be pointed out that in connecting two locking collars 22 and 24 together that the respective cam locks 34 will be inserted into the respective recesses 38 and the locking collars will be rotated in counter directions such that each cam lock 34 is moved towards a respective stop 42 formed in the recess. As the locking collars 22 and 24 are being rotated, the outer face 36 of each locking collar 22 and 24 will extend into the cut-out 34c of the respective cam locks 34. Thus, the respective cam locks 34 are guided through the recesses 38 by the cooperation of the outer face 36 with the cut-outs 34c formed in the cam locks. It should be appreciated that the respective outer face 36 of the locking-collars 22 and 24 are slightly angled or cammed on the inside such that as the cam locks 34 are rotated within the locking collars 22 and 24 during a coupling operation that the respective locking collars 22 and 24 are drawn towards each other. As the locking collars 22 and 24 are drawn towards each other it is appreciated that they engage the adjacent sides of the inner flanges 12 and 14 and accordingly pull the inner flanges 12 and 14 closely together such that the face seals 16 tightly abut each other and form a sealed relationship.

To secure the locking collars 22 and 24 in a locked relationship, there is provided a latching or locking mechanism indicated generally by the numeral 50 with each locking collar 22 and 24. As will be appreciated, the latching mechanism 50 associated with each locking collar 22 and 24 will in a locked mode project downardly through the top of rim 30 and lock against the locking edge 34b of a respective cam lock 34. This will effectively lock a respective cam lock 34 of each locking collar between a stop 42 formed in the recess 38 and the latching mechanism 50 of a respective locking collar.

Turning to a detailed discussion of the latching mechanism 50 of each locking collar 22 and 24, it is appreciated that each latching mechanism 50 is associated with a selected lug 28 formed on the inner sleeve 26 of a respective locking collar 22 or 24. To achieve this, a selective lug 28 on each locking collar is formed so as to include a lug cavity or lug cut-out 28a. See FIG. 2 for example. Spanning the lug cut-out 28a is a pivot pin 52. It is appreciated that the pivot pin is supported at both opposed ends as contrasted to being supported in cantilever fashion. Pivotally mounted to the pivot pin 52 is a latching lever arm 54. The lever arm 54 includes a locking head 56 that in a locked mode extends downwardly through an opening 58 formed in the outer rim 30. The latching lever arm 54 is biased towards a locked position by a torsional spring 60 wound around the pivot pin 52 and held between the lever arm 54 and the outer rim 30 of a respective collar 22 or 24. As seen in FIG. 4, the cam lock 34 of one locking collar is securely locked in the recess 38 of another locking collar by the cooperative action of the locking head 56 and the adjacent stop 42.

Figure 2:
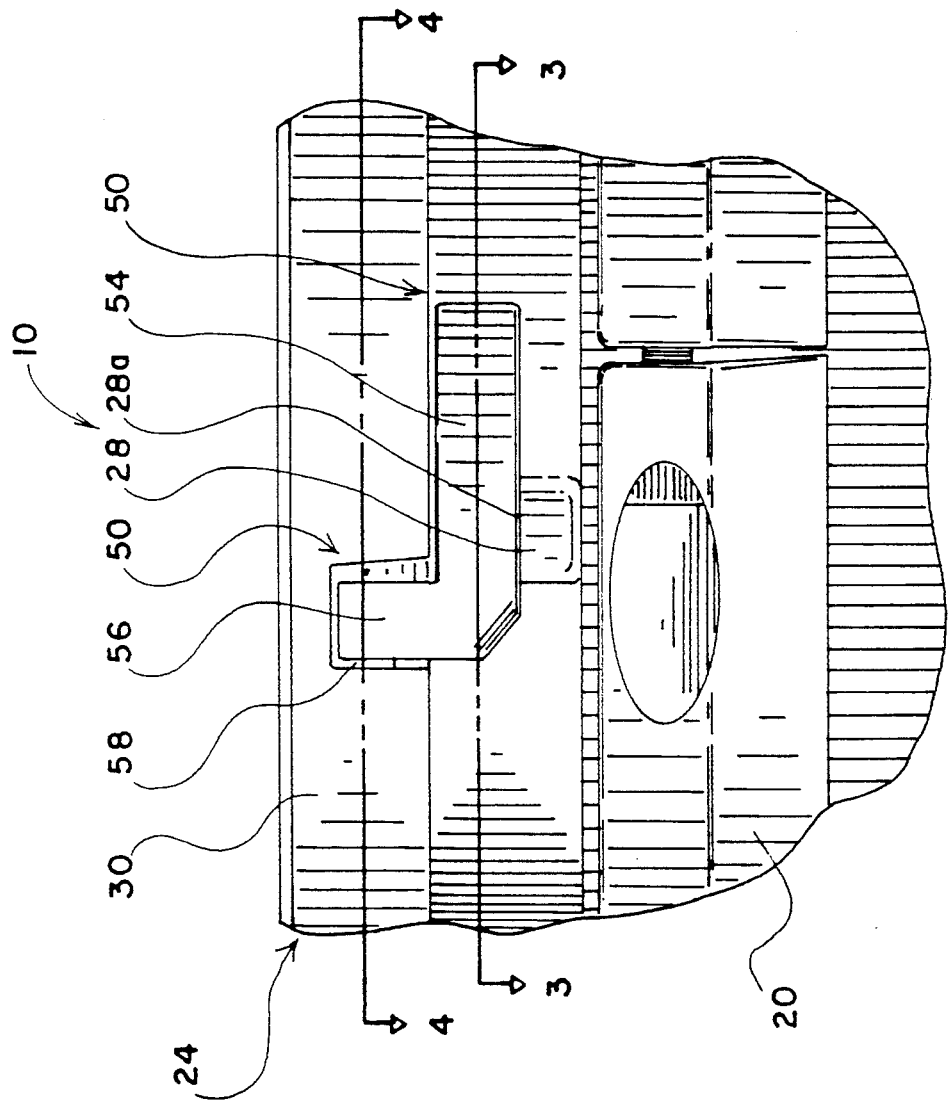
FIG. 2 is a fragmentary plan view of a portion of a hose coupling assembly showing the latching mechanism.
Figure 3:
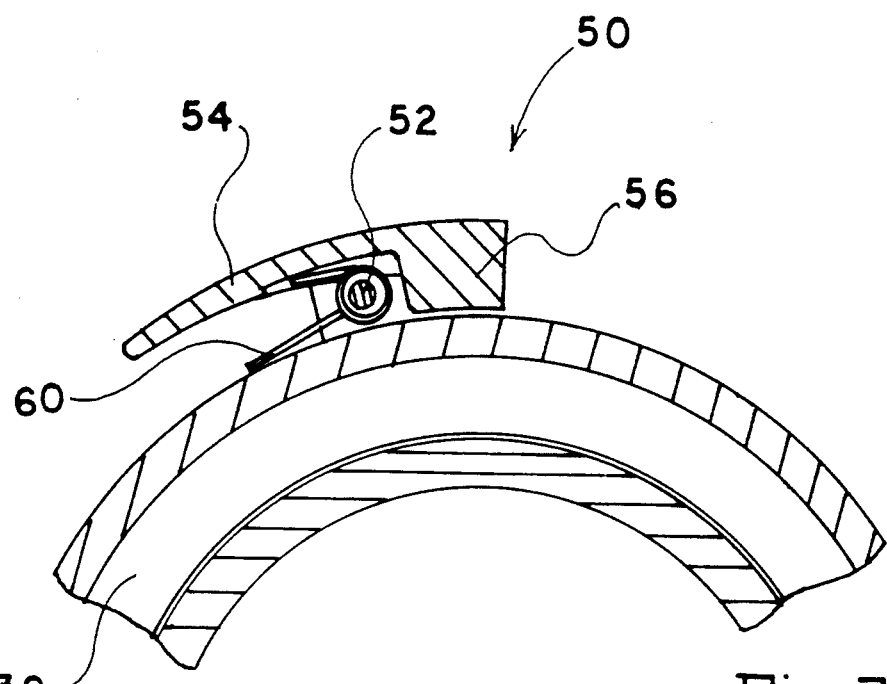
FIG. 3 is a fragmentary cross-sectional view taken through the line 3—3 of FIG. 2.

Of prime importance in the present invention is the construction of the latching mechanism 50 shown in FIGS. 2, 3 and 4. In this regard, the lever arm 54 is supported on the pivot pin 52 which is in turn supported at spaced and opposed points within the lug cavity of 28a. This permits the locking mechanism 50 to withstand substantial impact and abuse and still maintain the hose coupling assembly 10 in a sealed and locked relationship at all times.

The present invention may, of course, be carried out in other specific ways than those herein set forth without parting from the spirit and essential characteristics of the invention.

What is claimed is:

1. A hose coupling assembly for coupling two ends of a hose together comprising:
   a) a pair of flanges with each flange adapted to fit inside the end of a hose and to extend therefrom;
   b) a retainer for securing the underlying flange within the end of the hose;
   c) seal means associated with said flanges for sealing the hose coupling assembly when the two ends of the hose are coupled together; and
   d) a pair of rotatable locking collars, co-acting means on said locking collars and flanges for confining said locking collars on the flanges such that said locking collars are freely rotatable on the flanges when the hose coupling assembly assumes an uncoupled mode, each locking collar comprising:
   1) an inner sleeve;
   2) a raised outer rim disposed adjacent the inner sleeve and including an outer face and wherein the raised rim and outer face define an enclosed inner race formed within the outer raised rim that extends around the outer raised rim, and wherein there is formed a circumferential opening adjacent the outer face of the raised outer rim;
   3) a cam lock stop formed in the race of each raised outer rim;
   4) a cam lock projecting outwardly from each raised outer rim and including a leading and a trailing edge and wherein each cam lock is designed to be inserted and moved through the circumferential race formed in the outer raised rim of an adjacent mating locking collar;

5) a cam lock inlet formed in each outer face for permitting a cam lock associated with the other locking collar to be inserted therethrough such that the cam lock can be moved through a respective circumferential race;

6) a series of lugs circumferentially spaced around the inner sleeve with each lug extending parallel to the axis of the hose coupling assembly;

7) a cut-out formed transversely across and completely through at last one lug on each sleeve and wherein the cut-out effectively splits the lug so as to form a pair of spaced apart lug portions on opposite sides of the cut-out;

8) a cam lock latching mechanism associated with each locking collar for engaging the cam lock of the other locking collar and locking the cam lock within the race by securely confining the cam lock between the locking mechanism and the cam lock stop formed in the race so as to effectively lock the two flanges together in end-to-end relationship; and 9) each cam lock latching mechanism being attached to the split lug on a respective inner sleeve of a respective locking collar and each cam latching mechanism including a pivot pin for said attachment spanning the transverse cut-out of the split lug and supported on opposite ends by the two spaced apart lug portions formed by the transverse cut-out formed in the respective lug, and further including a transverse rocker arm extending through the transverse cut-out formed in the respective lug and pivotally mounted on the pivot pin and supported on opposite sides by the split pair of lug portions such that both the pivot pin and rocker arm are supported on opposite sides, and wherein the rocker arm includes a locking head formed on one end thereof with the locking head being adapted to extend downwardly through an opening formed in the raised outer rim for locking the cam lock between the locking head and the cam lock stop formed in the recess of the raised outer rim, and wherein there is biasing means associated with the rocker arm for biasing the rocker arm and locking head downwardly towards a locked position where the locking head engages the trailing edge of the cam lock while the cam lock stop is stationed on the opposite sides of the cam lock so as to securely hold the cam lock within the recess and accordingly lock the two locking collars together.

2. The hose coupling assembly of claim 1 wherein the outer face of the raised outer rim includes an inner edge and wherein each cam lock includes an elongated cut-out that is designed to ride about the inner edge of the outer face as the cam lock is moved through the formed recess within a respective raised outer rim.

* * * * *